Aug. 15, 1944. D. C. GOFF 2,355,966
UNDERGROUND INSULATED PIPE SYSTEM
Filed May 20, 1942  2 Sheets-Sheet 1
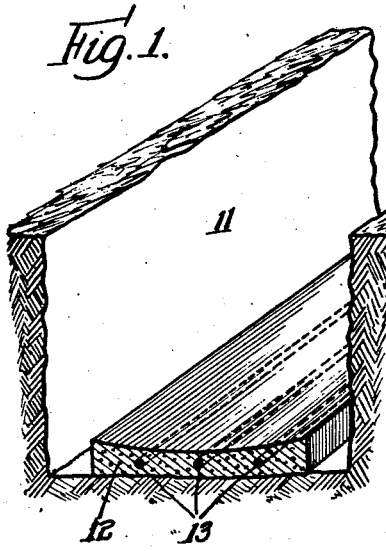
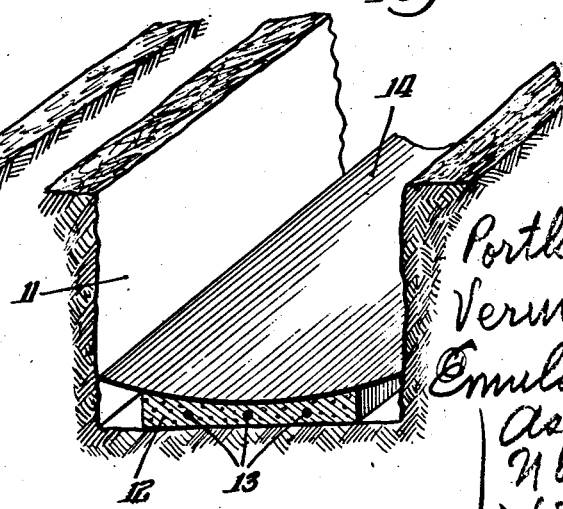
Portland Cement
Vermiculite
Emulsion
Asphalt
NaOH
Vinsol
Water
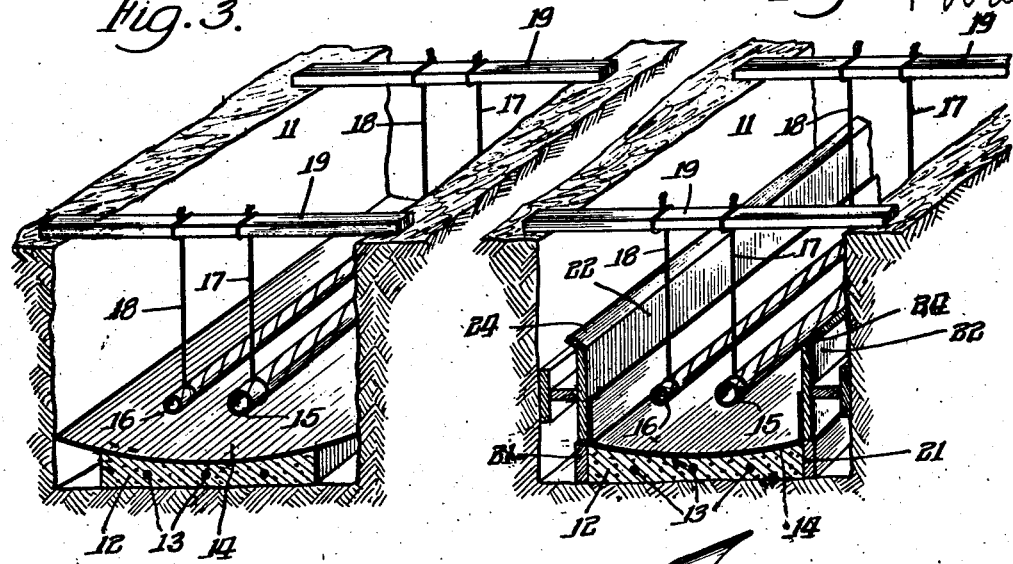
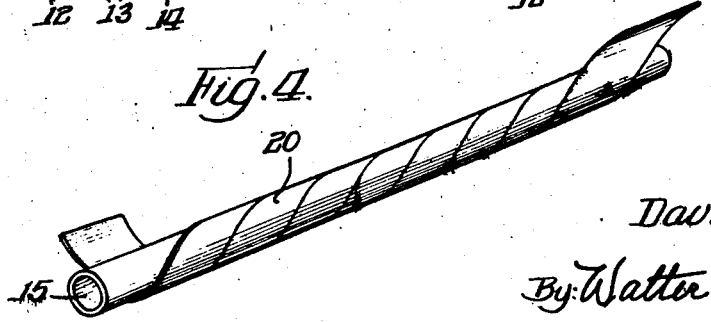
INVENTOR.
David C. Goff
By Walter M. Fuller
atty

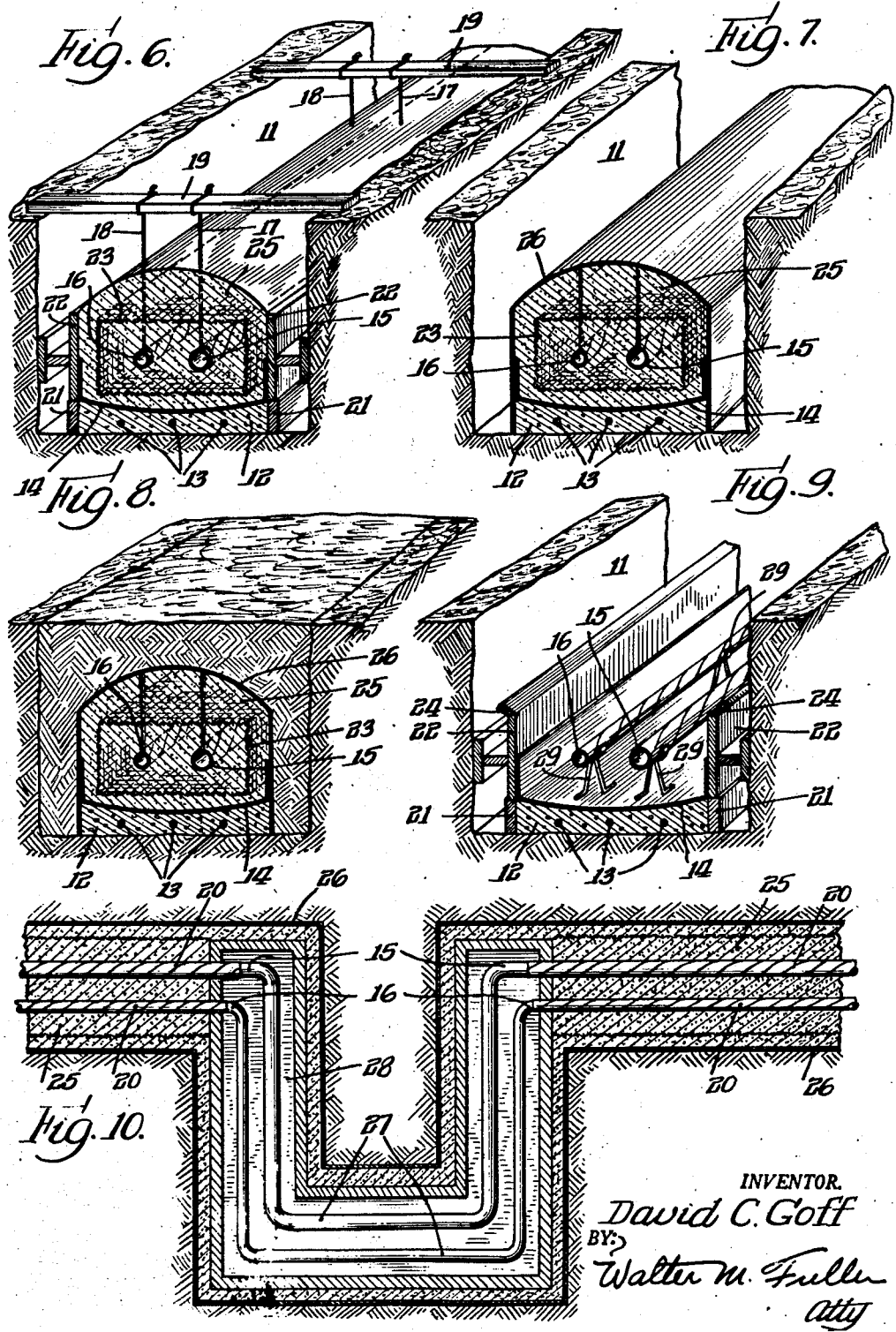

Patented Aug. 15, 1944

2,355,966

UNITED STATES PATENT OFFICE 2,355,966

UNDERGROUND INSULATED PIPE SYSTEM

David C. Goff, Omaha, Nebr., assignor, by mesne assignments, to Universal Zonolite Insulation Company, Chicago, Ill., a corporation of Montana Application May 20, 1942, Serial No. 443,782

7 Claims. (Cl. 138—48)

The present invention pertains to certain structural and functional betterments in the underground transmission pipes or lines for heating-systems, or the like, whereby to gain substantial advantages in the structures themselves and in their methods of production.

In many such systems it has been customary to heat-insulate such pipes by means of insulating-material enclosed in hollow steel-casings or clay-tile conduits, ranging from about 3 feet in length to 20 feet, such prefabricated casing or conduit sections necessitating much handling in manufacture, transportation and installation, and, in addition, such sectional structures have many joints to caulk and waterproof, it being practically impossible to waterproof such joints permanently, and, when water enters, it usually materially lessens the efficiency of the system. Also, such types of construction necessitate the installation of base-drains to carry away such water as may enter through breaks.

In installing such casing-type materials through swampy or boggy terrain, it is extremely difficult to keep water from entering the system during the process of establishing it, which service ordinarily requires the use of trained and skilled mechanics throughout.

Moreover, the insulating-material in the casing surrounding the steam or other pipes is not in itself waterproof, and hence it is essential that a complete job of waterproofing the same be provided and maintained as otherwise the efficiency of such insulation is detrimentally lessened.

In following such prior-art procedures, the costs of materials and the expense of installation are relatively high.

Now, as contrasted with the foregoing earlier art methods, the present invention involves the employment of a new type of light-weight heat-insulating concrete, which permits of an improved outstanding procedure and substantially better resulting structure, such concrete including a light-weight aggregate—expanded-vermiculite—which possesses properties unusually well qualifying it for the purpose indicated.

Whereas the proportions of the ingredients of such light-weight heat-insulating concrete may vary as circumstances indicate, a suitable mixture for use under ordinary conditions would be 1 bag of Portland cement (about 94 pounds), 8 cubic-feet of expanded-vermiculite (minus 10 plus 65 mesh), 7 quarts of Admix and 26 gallons of water; such Admix comprising a suitable asphalt-emulsion which may be prepared by mixing approximately 55 parts by weight of 50-60 penetration asphalt from California crude petroleum with about 43.35 parts of hot water containing substantially 0.15 part of caustic-soda to produce a quick-breaking emulsion by the well-known processes as specified in United States Patent No. 1,643,675, Montgomerie, Bituminous emulsion, granted September 27, 1927, and incorporating therein about 1.5 parts of saponified "Vinsol" resin to convert the emulsion to the slow-breaking mixing type.

The "Vinsol" resin is a trade-marked product manufactured by the Hercules Powder Company and is referred to in United States Patent No. 2,114,393, Lane, Grease-proof impregnated article and method preparing, granted April 19, 1938, and is more fully disclosed in United States Patent No. 2,193,026, Hall, Resin and process of producing, granted March 12, 1940; United States Patents No. 2,155,141, Maters et al., Emulsifying agents and processes of making same, granted April 18, 1939; and 2,199,206, Maters et al., Bituminous emulsion, granted April 30, 1940, disclosing methods of saponifying "Vinsol" resin.

The novel heat-insulating system is unique in that the thus formed insulation is poured monolithically around the pipe or pipes which are to convey the heated fluid or to conduct the returning condensed steam, for example, and, in this way, the hollow clay-tile, or metal-casing conduit, with its tendency to breaks and the essential joints and costly laborious methods of installation are eliminated, the new concrete being poured around the one or more pipes and allowed to dry, whereupon the entire surface thereof is waterproofed as by 15 pound felts and pitch or asphalt.

Such concrete composition may be conveniently produced by mixing the water, cement and bituminous-emulsion in a concrete-mixer for about 2 and ½ minutes after which the vermiculite is added and the mixing continued for about another like period, whereupon it is poured into the form around the pipes, thus providing one continuous monolithic mass of waterproof insulation which extends from one expansion-joint to another, a distance frequently equally 200 feet to 300 feet.

Inasmuch as the improved system, including the labor cost of installation, is relatively inexpensive, the thickness of the insulation around the pipes may be increased with the result that greater efficiency is obtained, it being also borne in mind that the maintenance costs, repairs, etc., are considerably less in this novel jointless system.

In the hollow-conduit systems, moisture will enter, contraction and expansion will break the waterproofing with which the joints are sealed, or a poor job of workmanship will allow this to happen, and any water entering such hollow casing will cause the loose, fluffy insulation to settle or pack and thus considerably reduce its efficiency as an heat-insulating medium.

There are no critical materials involved in the use of the system incorporating this invention, so that under strained economic or preparedness circumstances, an increased efficiency of operation is desirable, and in the new structure less fuel is necessary and greater efficiency in operation of the power-plant is obtained.

This insulating-concrete has sufficient structural strength that pipes may be embedded within the mass and their position maintained thereby indefinitely without the use of pipe roller or rocker supports, although these may be employed if desired.

The special properties of the new concrete affords the mass great elasticity, workability, and plasticity, and, in addition, tests show that it can be subjected to a 100 cycle of freezing and thawing without breaking up, cracking or disintegrating; the insulating-concrete is not hard and brittle; and it will stand much abuse without fracturing or rupturing.

The specified new heat-insulating concrete is more or less water-repellent and has low capillarity, several tests showing that when it is exposed to water continuously for 200 hours, the penetration is less than 1 inch, which means that, if, by some extraordinary circumstances, the outer waterproofing-jacket were punctured or broken, any resulting water entering would be entirely localized, that is, it would not spread and extend for great distances as in the case of hollow conduits with the subsequent building up of vapor steam pressure. In the event a small pressure were created within the insulation, it would be expelled through the same source in which the moisture entered, it being interesting to note that the insulating-concrete will float almost indefinitely in water, which indicates its waterproofness irrespective of the waterproof-jacket employed.

Such concrete is ideally suited for all working circumstances, in that it is laid and handled under the same general working conditions as regular structural sand-and-gravel concrete and it may be satisfactorily laid in damp, wet or boggy spots.

Under winter conditions, the new concrete may be laid in a ditch in zero temperatures, by merely using the same precautions as with the above-mentioned regular concrete, the drying out and the precautions against freezing being automatically taken care of in the nature of the hot steam-pipe within the center of the mass, this constituting an ideal drying-out process inasmuch as it takes place from the inside of the mass outwardly and insures a minimum drying-out period.

In the event speed is the essence in closing up the line and no head of steam is available, the line having been tested with air, a portable boiler can be satisfactorily employed by the contractor installing the system to insure steam in the line for such drying-out period, but in other than winter conditions, the concrete dries and sets very rapidly.

This insulating-concrete is permanent, its basic element being exfoliated or expanded vermiculite, the chemical properties of which are alumina, silica and magnesium; it is inorganic, inert and non-corrosive, the binder employed being likewise inorganic and inactive, and consequently there is no deterioration, rotting, moulding or disintegration.

Furthermore, such concrete is fireproof and will safely withstand temperatures up to 1000° F. with the standard binder, whereas the expanded-vermiculite aggregate used in the concrete will withstand temperatures up to approximately 2400° F.

Again, the concrete being inert, it has no effect on the electric-wires or conduits within itself or with which it comes into contact.

The density of such concrete is approximately 23 pounds per cubic-foot, which indicates that at no time is its weight in any way a detrimental factor.

Any number of pipes may be insulated in one operation, the concrete having a good slip and hence flowing completely around a multiplicity of pipes with no tamping and with a minimum of vibration.

The commonly-used loop-type of expansion is provided for in the system by the use of a simple pocket which allows the pipe or pipes to slide back and forth as they contract and expand. In the sleeve, or piston, type of pipe expanders, an insulating cement of Zonolite is used and the insulation is applied directly to the pipes, expanders, etc., in such type pit to a thickness of 2 inches to about 3 inches.

Functionally, the use of the new system of underground insulation will allow the entire system to operate at a high degree of efficiency.

Turning now to the accompanying drawings, present preferred embodiments of the current invention have been illustrated in detail therein to enable those acquainted with this art to readily understand the invention and the advantages and benefits accruing from its employment, and, for simplicity, like reference numerals have been used to designate the same parts throughout the several views.

In these drawings—

Figure 1 is a cross-section and fragmentary perspective view of the trench in which the insulated pipe-system is to be constructed, a reinforced-concrete base having been provided on the floor of such excavated channel;

Figure 2 is a similar view showing the base covered with a felt-stratum wider than the base;

Figure 3 shows two pipes suspended in the trench above the base;

Figure 4 illustrates in perspective the manner of spirally covering the pipes;

Figure 5 portrays the base and trench provided with form-members;

Figure 6 presents a like cross-section and partial perspective view after the reenforced concrete has been poured in the form around the pipes;

Figure 7 shows the same covered with a waterproofed-felt jacket after the pipe-supporting means has been severed and removed, the trench being ready for refilling with the removed dirt;

Figure 8 shows the trench refilled;

Figure 9 is a view similar to that of Figure 5 with a different means for supporting the pipes; and Figure 10 is a horizontal section illustrative of one of the expansion-loops.

By reference to these drawings, it will be noted that the trench 11, having been dug usually for the full length of the piping to be used, such as a steam-pipe and a companion return-pipe to be employed in the entire system, an ordinary structural-concrete base 12, sometimes with a concave top surface (in some cases 4 inches deep at edges and 5 inches deep at center) is provided on the floor of the trench, and such base usually, but not necessarily in all instances, incorporates the plurality of lengthwise-disposed rods 13, say for example, one-quarter inch in diameter, the width of the base being less than that of the trench to provide for the additional factors hereinafter specified.

On top of such base 12 is applied two plies of 15-inch asphalt-felt 14 mopped to the base and between plies and over the top with 170° asphalt, a suitable overhang being provided at each side of the base, for instance, each such projection being about 6 inches wide.

A steam-pipe 15 and its associated or correlated return-pipe 16 are then suspended longitudinally in the trench above the base 12 by mounting them on wires 17 and 18 held from above by supports 19 resting on the ground surface and spaced apart along the length of the trench.

Before being thus mounted in the trench or channel, each such pipe is wrapped spirally with 9-inch red-rosin paper tape 20 (Figure 4) to prevent bonding of the concrete to the pipe and to allow space for linear slip or movement of the pipe in the concrete due to temperature expansion and contraction of the pipe.

Thereupon, supports 21, 21 are placed along the sides of the base 12 and on these are located two form-members 22, 22, braced against the sides of the trench and having their inner faces in register with the sides of the base, the overhanging sections of the felt 14 having been bent up just inside of such surfaces of the form-members, as shown in Figure 5.

A wire-mesh reenforcement 23 of suitable length, size and shape, surrounding the pipes, but not contacting them, having been put in place, the concrete is poured into such form on top of the felt 14 and around the pipes, the top face of such concrete body desirably being arched upwardly as illustrated and shaped by means of a suitable template (not shown) and which may cooperate with screeds 24, 24 previously mounted on the top edges of the form-members.

The body of light-weight, heat-insulating, pipe-encasing concrete 25 thus formed having been allowed to set, either with or without the aid of heat in one or more of the pipes, and, the pipe or pipes being now adequately supported by such concrete, the two wires 17 and 18 are cut at the surface of the concrete and such severed portions and their supports 19, 19 are removed, the form-members being also taken out of the trench.

Then two plies of waterproofed asphalt-charged felt 26, with suitable overlaps as required, are mopped to the surfaces of the two kinds of concrete from the bottom of one side of the base up over such side, the corresponding side of the insulating-concrete including the upturned section of the felt 14, over the top of such concrete and down the other side of the structure to the bottom of the concrete-base, thus thoroughly waterproofing all surfaces of the insulating-concrete.

Subsequently, the remainder of the trench may be filled up with earth as presented in Figure 8.

At suitable intervals along the length of such heat-insulated pipe-system, say 200 feet to 300 feet apart, the pipes are provided with expansion and contraction loops or bends 27, 27 in a pocket 28, as illustrated in Figure 10, and ordinarily from one such set of pipe-loops to the next set, because of the advantages accruing from the employing of such type of structure, it being obvious that the bends or loops in the pipes have sufficient play to compensate for the elongation and shortening of the pipes due to temperature changes.

As is also shown in Figure 10, the heat-insulating concrete 25 may extend monolithically the entire length of the system, which in some cases may be miles long, although it is not in direct contact with the pipes at the expansion and contraction loops.

The advantages of this type of structure and its method of production having been hereinbefore presented somewhat in detail, their repetition here is unnecessary.

Although various details of structure have been set forth herein, it is to be understood that they are merely by way of example and that they may be changed in minor degree or more or less radically without departure from this invention as defined by the appended claims and without the loss or sacrifice of any of the advantages accruing from the use of the invention.

I claim:

1. In an underground heat-insulated pipe-system including a base and heat-insulated, fluid-conductive, expandible and contractible pipe-means supported by said base and having expansion-and-contraction compensation-means at intervals along the length of the system, the novel combination of improvements of said base being of structural-concrete and said heat-insulation of said pipe-means being heat-insulating concrete completely and solidly enclosing and supporting said pipe-means solely on said concrete-base and constituting a monolithic embedment for said pipe-means from each said compensation-means to the next, said insulating-concrete weighing less than 50 pounds per cubic-foot, said pipe-system being capable of conveying fluid with a heat-differential of at least 150° F. without injury to the system.

2. The novel combination of improvements set forth in claim 1 in which said insulating-concrete weighs approximately 23 pounds per cubic-foot.

3. The novel combination of improvements set forth in claim 1, in which said heat-insulating concrete has as its aggregate expanded-vermiculite at least in major part.

4. The novel combination of improvements set forth in claim 1 including the additional novel improvement that said heat-insulating concrete has a heat-conductivity of about 0.60 B. t. u. per hour per square foot of slab per degree Fahrenheit of temperature difference between opposite surfaces of a slab of one inch thickness.

5. The novel combination of improvements set forth in claim 1 including the additional novel improvement of a waterproof cover entirely encasing said heat-insulating concrete.

6. The novel combination of improvements set for in claim 1 including the additional novel improvements of a layer of waterproof-material between said base and said heat-insulating concrete extending at least part way up the opposite side faces of said heat-insulating concrete and of a second layer of waterproof-material covering the top of said heat-insulating concrete and extending down the sides thereof.

7. The novel combination of improvements set forth in claim 1 including the additional novel improvements of said heat-insulating concrete having as its aggregate expanded-vermiculite at least in major part, a layer of waterproof-material between said base and said heat-insulating concrete extending at least part way up the opposite sides of said heat-insulating-concrete, and a second layer of waterproof-material covering the top of said heat-insulating concrete and extending down the sides thereof.

DAVID C. GOFF.